United States Patent [19]

Chang et al.

[11] Patent Number: 5,933,542
[45] Date of Patent: Aug. 3, 1999

[54] METHOD AND APPARATUS FOR BLOCKING EFFECT REDUCTION IN IMAGES BY POST-PROCESSING IN THE SPATIAL DOMAIN

[75] Inventors: Ching-Fang Chang, San Jose; Chuen-Chien Lee, Fremont, both of Calif.

[73] Assignees: Sony Corporation, Tokyo, Japan; Sony Electronics, Inc., Park Ridge, N.J.

[21] Appl. No.: 08/637,206

[22] Filed: Apr. 24, 1996

[51] Int. Cl.⁶ .............................. G06T 5/00; G06T 9/00; H04N 1/409; H04N 1/415
[52] U.S. Cl. .................. 382/264; 382/268; 382/275; 382/250; 358/433; 358/463
[58] Field of Search .................. 382/268, 266, 382/264, 275, 260, 254, 248, 250; 358/463, 433, 432; 348/420, 404, 403

[56] References Cited

U.S. PATENT DOCUMENTS

| | | |
|---|---|---|
| 4,805,129 | 2/1989 | David . |
| 4,910,594 | 3/1990 | Kondo . |
| 5,023,710 | 6/1991 | Kondo et al. . |
| 5,049,990 | 9/1991 | Kondo et al. . |
| 5,070,403 | 12/1991 | Wilkinson . |
| 5,109,451 | 4/1992 | Aono et al. ............................. 382/248 |
| 5,142,537 | 8/1992 | Kutner et al. . |
| 5,220,616 | 6/1993 | Downing et al. ........................ 358/268 |
| 5,272,536 | 12/1993 | Sudo et al. . |
| 5,335,019 | 8/1994 | Herz et al. . |
| 5,337,088 | 8/1994 | Honjo ...................................... 348/420 |
| 5,351,083 | 9/1994 | Tsukagoshi . |
| 5,381,354 | 1/1995 | Soloff . |
| 5,422,964 | 6/1995 | Devimeux et al. ..................... 358/266 |
| 5,450,506 | 9/1995 | Gillard et al. ........................... 382/254 |
| 5,537,493 | 7/1996 | Wilkinson .............................. 382/248 |
| 5,590,064 | 12/1996 | Astle ....................................... 382/268 |

FOREIGN PATENT DOCUMENTS

| | | |
|---|---|---|
| 571171A2 | 5/1993 | European Pat. Off. . |
| 590922A2 | 9/1993 | European Pat. Off. . |
| 680217A2 | 4/1995 | European Pat. Off. . |
| 680219A2 | 5/1995 | European Pat. Off. . |
| 4128977 | 8/1991 | Germany . |
| 2287153 | 9/1995 | United Kingdom . |
| 9119271 | 12/1991 | WIPO . |

OTHER PUBLICATIONS

Patent Abstracts of Japan, Publication No. 05219493, Aug. 27, 1993, "Picture Information Restoring Device," 1 page.
Patent Abstracts of Japan, Publication No. 0434372, Nov. 27, 1992, "Image Data Compressor," 1 page.
Patent Abstracts of Japan, Publication No. 05110868, Apr. 30, 1993, "Visual Characteristic Region Conversion System," 1 page.
International Search Report Dated Jun. 10, 1997 for PCT Patent Application No. PCT/US 97/00499 filed Jan. 10, 1997.
International Search Report Dated Jun. 10, 1997 for PCT Application No. PCT/US 97/00737 filed Jan. 10, 1997.
International Search Report Dated Jun. 30, 1997 for PCT Patent Application No. PCT/US 97/03292 filed Mar. 3, 1997.

(List continued on next page.)

*Primary Examiner*—Scott A. Rogers
*Attorney, Agent, or Firm*—Blakely, Sokoloff, Taylor & Zafman

[57] ABSTRACT

An apparatus and method for post processing image data which previously was encoded using a discrete cosine transform in order to remove resulting blocking effects. Correction coefficients are generated by determining the least mean square error of the blocking error. The correction coefficients are adjusted to be within the quantization range of the quantization step size used during the coding process. The adjusted correction coefficients are then used to generate the correction terms which are subsequently combined with the original image data to generate an image exhibiting reduced blocking effects when the image is displayed.

26 Claims, 3 Drawing Sheets

OTHER PUBLICATIONS

"An Adaptive Image Quality Improvement Method for DCT Coding Schemes," *PCS '93 1993 Picture Coding Symposium Proceedings*, Mar. 17–19, 1993, Swiss Federal Institute of Technology, Lausanne—Switzerland, 3 pages.

Patent Abstracts of Japan, Publication No. 07087500, Mar. 31, 1995, "Method for Post–Processing for Decoded Picture Signal," 1 page.

Ken Sauer, "Enhancement of Low Bit–Rate Coded Images Using Edge Detection and Estimation," *Graphical Models and Image Processing*, Jan. 1991, vol. 53, No. 1, pp. 52–62.

Avideh Zakhor, "Iterative Procedures for Reduction of Blocking Effects in Transform Image Coding", Jun. 10, 1991, pp. 91–95.

International Telecommunication Union, "Line Transmission of Non–Telephone Signals", Mar. 1993, pp. 1–25.

METHOD AND APPARATUS FOR BLOCKING EFFECT REDUCTION IN IMAGES BY POST-PROCESSING IN THE SPATIAL DOMAIN

BACKGROUND OF THE INVENTION

1. Field of the Invention

The present invention relates to the removal of blocking effects in images previously compressed and decompressed. More particularly, the present invention relates to the removal of blocking effects in images compressed in accordance with MPEG, JPEG and other DCT based image coding formats.

2. Art Background

The need to compress digital image data, whether static or dynamic (i.e., video images) images has dramatically increased. One reason is the dramatic popularity of multimedia computer systems and software. Another reason is switch to digital broadcasts of station programming. One example of the latter is direct satellite broadcasts, such as DSS™. In order to minimize the bandwidth required to transmit broadcasts of programs or to minimize the amount of storage space required to store certain images, compression techniques are utilized. Thus, the image data is transmitted or stored in a compressed format and prior to the display of the image, the image data is decompressed. Examples of widely utilized compression algorithms are those that comply with the MPEG (Moving Pictures Experts Group) and JPEG (Joint Picture Experts Group) standards.

Many compression processes, including those that comply with MPEG or JPEG standards, utilize transform coding. In a transform coding process, an image is divided into small blocks. The transform of each block is taken, the coefficients of which are quantized in accordance with a determined quantization factor q. The most popular transform is the discrete cosine transform (DCT).

However, one negative effect of the process is referred to as the "blocking effect". By dividing the image into blocks prior to encoding, discontinuities (referred to as blocking effects) between adjacent blocks occurs through the encoding and decoding processes. This is represented in a displayed decompressed image by clear jumps between colors or greyscales as opposed to a smooth change.

Pre-processing and post-processing techniques are utilized to minimize blocking effects. Pre-processing techniques dictate that the originator of the image data must perform certain steps to minimize blocking effects. Post-processing techniques, although logistically better as the correction is performed after decompression, has its problems. For example, one of the simplest techniques is to process the decompressed image data through a low pass filter. Although the blocking effects are decreased, the sharpness of the displayed image is negatively affected.

SUMMARY OF THE INVENTION

In the method and circuit of the present invention post processing is performed on decompressed image data to minimize blocking effects without affecting the sharpness of the image.

To minimize the blocking effect, correction terms are added to the image. The correction terms are added to the blocking image such that the mean square of the blocking error is reduced. Therefore, in one embodiment the blocking error is first determined. Using the blocking error, correction coefficients are generated. These correction coefficients are preferably constrained to be within ranges dictated by the quantization values used in the original compression process. The adjusted correction coefficients are then used to generate the correction terms which are subsequently combined with the original image data to generate an image exhibiting reduced blocking effects when the image is displayed.

BRIEF DESCRIPTION OF THE DRAWINGS

The objects, features and advantages of the present invention will be apparent to one skilled in the art in light of the following detailed description in which.

DETAILED DESCRIPTION

The present invention provides a simple but effective apparatus and method for minimizing blocking effects that occur in discrete cosine transformed images. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
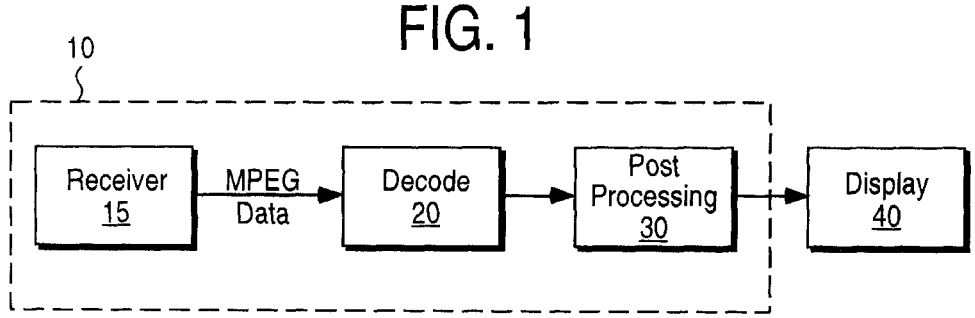
FIG. 1 is a simplified block diagram of a system that operates in accordance with the teachings of the present invention.

A simplified block diagram of an exemplary system that operates in accordance with the teachings of the present invention is illustrated in FIG. 1. To minimize on transmission bandwidth and/or to save on the amount of space required to store an image, the image is frequently formatted in a compressed form which utilizes discrete transforms. Popular examples of formats include those that comply with the JPEG (Joint Picture Experts Group) and MPEG (Motion Picture Experts Group) standards. The system illustrated includes the receiver/display system 10 and display 40. One example of a receiver/display system 10 is a Video CD player. Another example is a direct satellite receiver such as one manufactured by Sony Corporation. Other types of receivers/players/storage/display systems are also contemplated.

The receiver 10 receives the compressed image. The receiver may be one of many types of receiving devices configured to receive image data. Alternately, the receiver may be one to receive television broadcast signals or a device coupled to directly to a storage unit (e.g., memory, VCR, CD ROM or the like) to receive images retrieved from storage. For purposes of explanation, the image data is received in a format compatible with the MPEG specification; however, the other types of compressed formats that use discrete transforms to compress the data can also be used.

Once the image data is received, the data is decoded (i.e., decompressed) by decoder 20 and processed by post-processor 30 in order to remove blocking effects created by the encoding and decoding processes. The modified image data subsequently displayed by display subsystem 40 shows an image in which the blocking effects are minimized.

It the present invention the blocking error is used to find correction coefficients which are adjusted to be within the quantization range utilized during the encoding process. Correction terms are generated from the adjusted correction coefficients. The correction terms are added to the image containing the blocking effects to minimize the blocking effects. Preferably, this process is performed on a block by block basis. The block size is determined by the block size utilized to perform the DCT process during encoding. However, it is readily apparent that the process can be performed on differing unit sizes.

Figure 2:
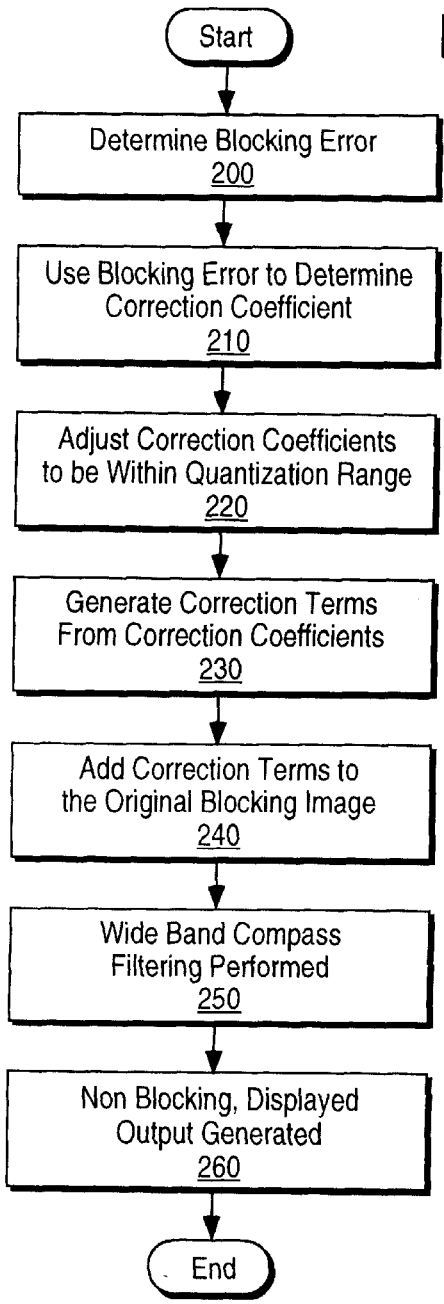
FIG. 2 is a flow chart depicting the process for minimizing blocking effects.

Referring to the flow chart of FIG. 2, at step 200, the image data received is examined to determined the blocking error. The blocking error is the estimated error between an image with (the blocking image) and an image without blocking effects. The blocking error can be calculated a number of ways. In one embodiment, the blocking error is obtained by determining the difference between luminance values of the blocking image and the blocking image processed through a low pass filter. An example of a low pass filter is a 5×5 median filter (For further information on median filters, see Anil K. Jain *Fundamentals of Digital Image Processing*, (1989 Prentice-Hall) pp. 244–249). The low pass filter functions to remove some blocking effects. In another embodiment, the blocking error is defined as the step or difference between pixel values (e.g., luminance values) across block boundaries.

Figure 3:
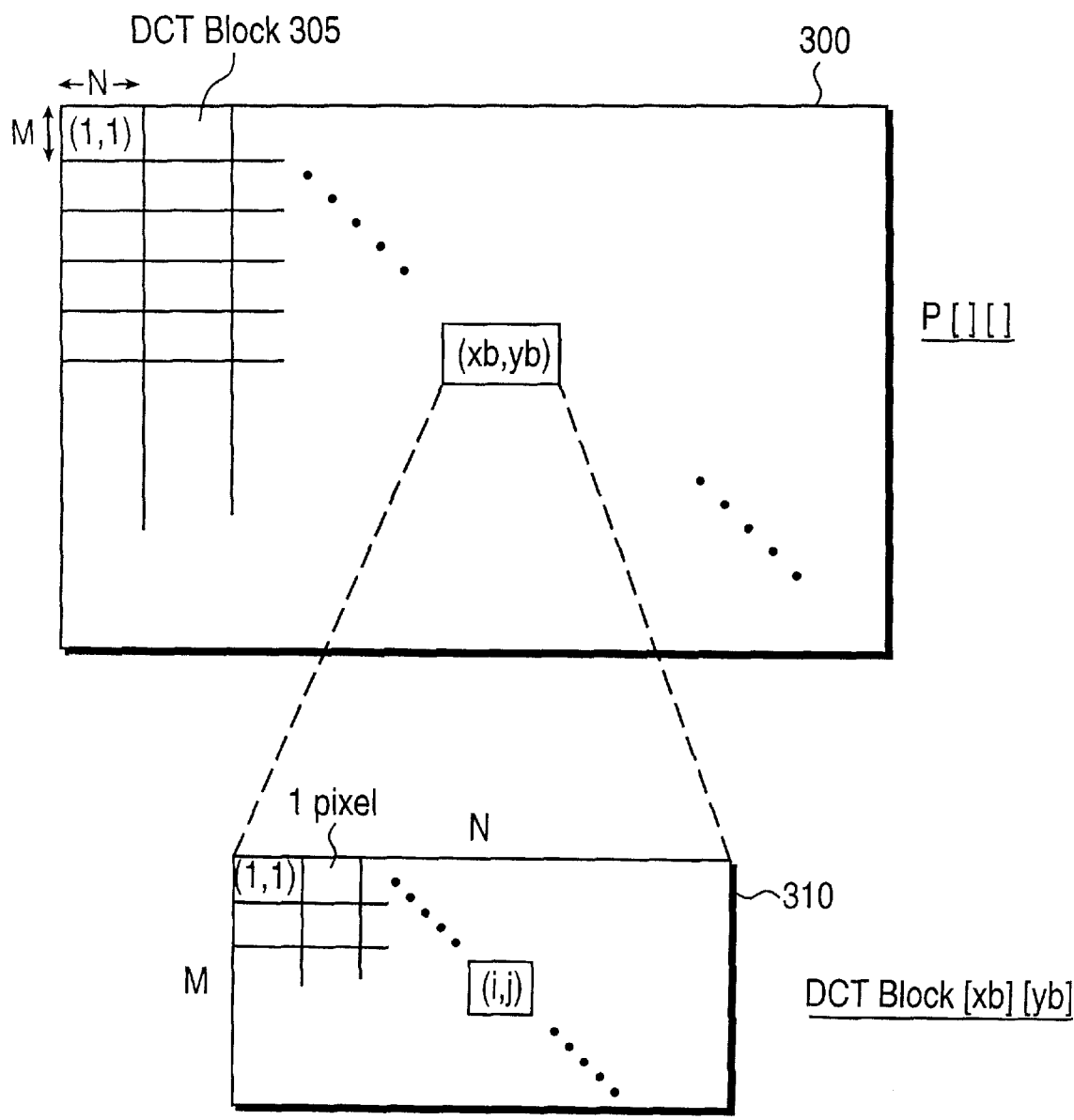
FIG. 3 is a diagram illustrating the process to be performed on a block by block basis.

In the present example, the blocking error is determined for each pixel within a block. A sample block is illustrated in FIG. 3. Referring to FIG. 3, the blocking image is formed of a plurality of blocks 305 dictated in size by the block size utilized to perform the DCT during encoding. In the present example the block size is defined to be N×M, where M is equal to 4 and N is equal to 8. A particular block is identified by the coordinate of a predetermined point within the block. In the present illustration, the coordinate (xb, yb) defines the lower right corner of the block 310 having the dimensions N×M. Within the block there are N*M pixels. For each pixel p[][] of the blocking image and each pixel of the low pass filtered image LPF_p[][], the blocking error E[i][j] within a block is determined by:

$$E[i][j]=p[xb*N+i][yb*M+j]-LPE\_p[xb*N+i][yb*M+j]$$

where 0<=i<N, 0<=j<M

It follows that after the correction terms have been added, the blocking error would be:

$$\text{Blocking Error} = E[i][j] + A[i][j]$$

where 0<=i<N, 0<=j<M, and A[i][j] is the correction term.

The correction term consist of a linear combination of several basis functions:

$$A[i][j] = \sum_{k=0}^{k_x-1} \sum_{l=0}^{l_x-1} a_{kl} \phi_{kl}[i][j],$$

where $\phi_{k1}[][]$ are the basis functions, $a_{kl}$ are the correction coefficients, $0 \leq k < kx, 0 \leq l < lx, kx*lx$ is equal to the number of correction coefficients. Preferably, the values of kx and lx are chosen to minimize the number of correction coefficients. For further information on basis functions, see e.g., Anil K. Jain, *Fundamentals of Digital Image Processing*, Chapter 5, pp. 132–180 (Prentice-Hall 1989).

The correction coefficients are determined by applying the least mean square error (LMSE) criterion on the blocking error. Therefore, in order to generate correction coefficients $a_{kl}$, the LMSE criterion is applied to the blocking terms after correction:

$$\frac{\partial MSE}{\partial a_{kl}} = 0$$

where $0 \leq k < kx, 0 \leq l < lx$, and MSE is the mean square error of the block.

The blocking errors generated are then utilized to generate correction coefficients. Furthermore, although any basis function can be used, it is preferred that the basis function is chosen to minimize the number of correction coefficients. Therefore, since the transform used in the present example is DCT-based, the basis function used is a cosine based function. Thus, continuing with the present example, the LMSE criterion is applied to the blocking errors of all the pixels in the block being processed where the MSE is defined as:

$$MSE = \frac{1}{MN} \sum_{i=0}^{N-1} \sum_{j=0}^{M-1} (E[i][j] + A[i][j])^2$$

where the basis function $\phi_{kl}[\,][\,]$ is chosen as:

$$\phi_{kl}[i][j] = \cos\frac{(2i+1)k\pi}{2N} \cdot \cos\frac{(2j+1)l\pi}{2M},$$

where $0 \leq k < kx, 0 \leq l < lx$

Thus, the MSE can be expressed as:

$$MSE = \frac{1}{MN} \sum_{i=0}^{N-1} \sum_{j=0}^{M-1} \left( E[i][j] + \sum_{k=0}^{kx-1} \sum_{l=0}^{lx-1} a_{kl} \cdot \cos\left[\frac{(2i+1)k\pi}{2N}\right] \cdot \cos\left[\frac{(2j+1)l\pi}{2M}\right] \right)^2$$

By setting the first partial derivative with respect to the correction coefficient equal to zero $$\left( i.e., \frac{\partial MSE}{\partial a_{kl}} = 0 \right),$$

the correction coefficient can be determined:

$$a_{kl} = -\frac{1}{MN} \left\{ \sum_{i=0}^{N-1} \sum_{j=0}^{M-1} E[i][j] \cdot \cos\left[\frac{(2i+1)k\pi}{2N}\right] \cdot \cos\left[\frac{(2j+1)l\pi}{2M}\right] \right\},$$

if $k = 0, l = 0$ $$-\frac{2}{MN} \left\{ \sum_{i=0}^{N-1} \sum_{j=0}^{M-1} E[i][j] \cdot \cos\left[\frac{(2i+1)k\pi}{2N}\right] \cdot \cos\left[\frac{(2j+1)l\pi}{2M}\right] \right\},$$

if $k = 0, l \neq 0$ or $k \neq 0, l = 0$ $$-\frac{4}{MN} \left\{ \sum_{i=0}^{N-1} \sum_{j=0}^{M-1} E[i][j] \cdot \cos\left[\frac{(2i+1)k\pi}{2N}\right] \cdot \cos\left[\frac{(2j+1)l\pi}{2M}\right] \right\},$$

if $k \neq 0, l \neq 0$

Alternately, the LMSE criterion is applied to the blocking errors of only the pixels located along the block boundaries in the block. Thus the MSE is defined as:

$$MSE = \frac{1}{2(M+N)}$$

$$\left\{ \begin{array}{l} \sum_{i=0}^{N-1}(E[i][0]+A[i][0])^2 + \sum_{i=0}^{N-1}(E[i][M-1]+A[i][M-1])^2 + \\ \sum_{j=0}^{M-1}(E[0][j]+A[0][j])^2 + \sum_{j=0}^{M-1}(E[N-1][j]+A[N-1][j])^2 \end{array} \right\}$$

Expanding the equation results in:

$$MSE = \frac{1}{2(M+N)}$$

$$\left\{ \begin{array}{l} \sum_{i=0}^{N-1}\left(E[i][0]+\sum_{k=0}^{kx-1}\sum_{l=0}^{lx-1}a_{kl}\cdot\cos\left[\frac{(2i+1)k\pi}{2N}\right]\cdot\cos\left[\frac{l\pi}{2M}\right]\right)^2 + \\ \sum_{i=0}^{N-1}\left(E[i][M-1]+\sum_{k=0}^{kx-1}\sum_{l=0}^{lx-1}a_{kl}\cdot\cos\left[\frac{(2i+1)k\pi}{2N}\right]\cos\left[\frac{(2M-1)l\pi}{2M}\right]\right)^2 + \\ \sum_{j=0}^{M-1}\left(E[0][j]+\sum_{k=0}^{kx-1}\sum_{l=0}^{lx-1}a_{kl}\cdot\cos\left[\frac{k\pi}{2N}\right]\cdot\cos\left[\frac{(2j+1)l\pi}{2M}\right]\right)^2 + \\ \sum_{j=0}^{M-1}\left(E[N-1][j]+\sum_{k=0}^{kx-1}\sum_{l=0}^{lx-1}a_{kl}\cdot\cos\left[\frac{(2N-1)k\pi}{2N}\right]\cdot\cos\left[\frac{(2j+1)l\pi}{2M}\right]\right)^2 \end{array} \right\}$$

For example, if kx=2 and lx=2, four correction coefficients, $a_{00}$, $a_{01}$, $a_{10}$, $a_{11}$, are used to generate a correction term. Therefore, the first partial derivative ,f the MSE with respect to the correction coefficient $a_{kl}$ is set to equal zero $$\left(\frac{\partial MSE}{\partial a_{kl}} = 0\right)$$

in order to determine the correction coefficients $a_{kl}$ (0<=k<2;0<=l<2):

$$a_{00} = \frac{-1}{2(M+N)}\left\{\sum_{i=0}^{N-1}(E[i][0]+E[i][M-1]) + \sum_{j=0}^{M-1}(E[0][j]+E[N-1][j])\right\}$$

$$a_{10} = \frac{-1}{N+2M\cos^2\frac{\pi}{2N}}\left\{\begin{array}{l}\sum_{i=0}^{N-1}\cos\left[\frac{(2i+1)\pi}{2N}\right](E[i][0]+E[i][M-1]) + \\ \cos\frac{\pi}{2N}\sum_{j=0}^{M-1}(E[0][j]-E[N-1][j])\end{array}\right\}$$

$$a_{01} = \frac{-1}{M+2N\cos^2\frac{\pi}{2M}}\left\{\begin{array}{l}\sum_{j=0}^{M-1}\cos\left[\frac{(2j+1)\pi}{2M}\right](E[0][j]+E[N-1][j]) + \\ \cos\frac{\pi}{2M}\sum_{i=0}^{N-1}(E[i][0]-E[i][M-1])\end{array}\right\}$$

-continued $$a_{11} = \frac{-1}{N\cos^2\frac{\pi}{2M} + M\cos^2\frac{\pi}{2N}}$$

$$\left\{\begin{array}{l}\cos\frac{\pi}{2M}\sum_{i=0}^{N-1}\cos\left[\frac{(2i+1)\pi}{2N}\right](E[i][0]-E[i][M-1]) + \\ \cos\frac{\pi}{2N}\sum_{j=0}^{M-1}\cos\left[\frac{(2j+1)\pi}{2M}\right](E[0][j]-E[N-1][j])\end{array}\right\}$$

At step 220, in the frequency domain, the correction coefficients are adjusted to be within the original quantization range defined by quantization steps used in the encoding process. This range is preferably defined to be plus and minus one-half of the quantization step. Thus, if the correction coefficient is within the quantization range specified by plus or minus one half of the quantization step, the adjusted value of the correction coefficient equals the original value of the correction coefficient. If the correction coefficient is outside the quantization range specified by plus or minus one half of the quantization step, the correction coefficient is updated to be the nearest boundary of the range (i.e., + −q/2, where q is the quantization step performed with respect to the correction coefficients).

Once the correction coefficients have been adjusted, the correction terms A[i][j] are generated, step 230. The correction terms are preferably generated according to the following equation:

$$A[i][j] = \sum_{k=0}^{kx-1}\sum_{l=0}^{lx-1}a_{kl}\cdot\cos\left[\frac{(2i+1)k\pi}{2N}\right]\cdot\cos\left[\frac{(2j+1)l\pi}{2M}\right]$$

where 0<=i<N, 0<=j<M, 0<kx<=N, 0<lx<=M, and kx*lx is the number of correction coefficients used to generate the correction term.

At step 240, the correction terms are added to the original blocking image to produce an image containing a decrease in blocking effects. For example, the adjusted image p'[i][j] is determined:

p'[i][j]=p[i][j]+A[i][j].

where p[i] [j] is pixel data of the original blocking image, p'[i] [i] is pixel data of the produced image exhibiting reduced blocking effects, and 0≦i<N, 0≦j<M.

Preferably, at step 250, wide band low pass filtering is applied to remove some of the artifacts introduced by adding the correction terms to the blocking image. For example a low pass filter is used to remove only very high frequency components while preserving the sharpness of the image as much as possible. In the current embodiment, a 3×3 median filter is used. For further information on median filters, see for example, Anil K. Jain, *Fundamentals of Digital Image Processing* (1989 Prentice-Hall Inc.) pp 244–249. Once filtered, the image can be processed for display, step 260. The resulting image displayed will reveal minimal blocking effect while maintaining a sharp image.

Figure 4:
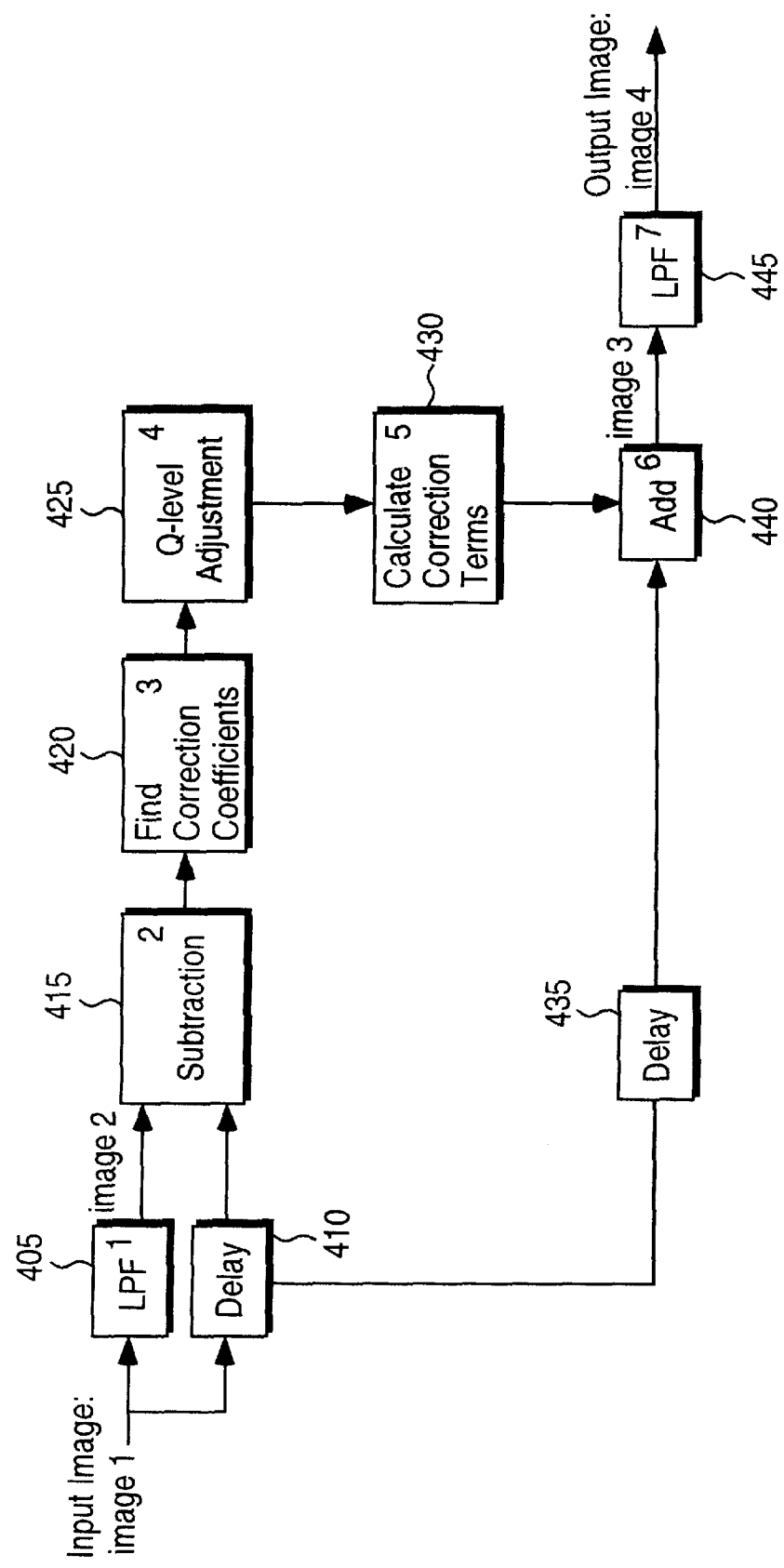
FIG. 4 is a simplified block diagram of a circuit that performs a process for minimizing blocking effects.

A simplified block diagram of an exemplary post processing circuit is illustrated in FIG. 4. It is apparent that the circuit can be implemented a variety of ways to achieve the postprocessing function. For example, the process can be implemented in a general purpose or dedicated computer system executing software to perform the steps described.

Referring now to FIG. 4, the post processing circuit includes a first low pass filter (LPF) 405, first delay 410, subtraction circuit 415, correction coefficient circuit 420, Q-level adjustment subcircuit 425, correction term circuit 430, second delay 435, addition circuit 440 and second LPF 445.

The first LPF 405 functions to filter out the high frequency components from the image data. For example, a 5×5 median filter can be used. As the filtered image data and original image data are subsequently input to the subtraction circuit 415, a delay 410 is preferably placed in the circuit to keep the original image data in synchronization with the filtered image data. Thus, the length of the delay 410 is approximately equal to the amount of time it takes to process the image data through the LPF 405. Both the original image data output by delay 410 and the filtered image data output by LPF 405 are input to a subtraction circuit 415 which generates the blocking error by subtracting the luminance values of the pixels of the blocking image from the luminance values of the corresponding pixels of the filtered image.

The blocking error determined by subtraction circuit 415 is input to correction coefficient 420 which generates the correction coefficients as discussed above. The correction coefficients generated are input to Q-level adjustment circuit 425 which adjusts the correction coefficients, as necessary, to be within the quantization range specified by the quantization step size utilized during the encoding process. The adjusted correction coefficients are used by correction term circuit 430 to generate the correction terms.

The correction terms are added to the original blocking image by addition circuit 440. To provide the timing of inputs to the circuit 440, a delay circuit 435 is used to delay the blocking image data from reaching the addition circuit 440 until the correction terms are generated. The second LPF is a wider band LPF that is used to remove artifacts generated during the addition process. The second LPF is chosen so that only very high frequency components are removed, while sharpness is preserved as much as possible. For example, a 3×3 median filter can be used.

The invention has been described in conjunction with the preferred embodiment. It is evident that numerous alternatives, modifications, variations and uses will be apparent to those skilled in the art in light of the foregoing description.

What is claimed is:

1. A method for minimizing blocking effects in a blocking image caused by prior performance of encoding/decoding processes including a transform and quantization process, said blocking image described by blocking image data, said method comprising the steps of:
   determining blocking errors in the blocking image data;
   generating correction coefficients in accordance with the least mean square error of the blocking errors;
   calculating correction terms using the correction coefficients;
   combining the blocking image data and the correction terms to generate an adjusted image data.

2. The method as set forth in claim 1, further comprising the step of adjusting the correction coefficients to be within quantization range defined by the quantization step size utilized in the coding process;
   wherein the step of calculating correction terms is performed using adjusted correction coefficients.

3. The method as set forth in claim 1, wherein the step of determining blocking errors comprises the steps of:
   filtering the blocking image data to remove high frequency components above a first identified threshold to generate a filtered image data; and
   subtracting the filtered image data from the blocking image data to generate the blocking errors.

4. The method as set forth in claim 3, wherein the first identified threshold is chosen such that most of the blocking effects are removed, at a cost of sharpness of the image.

5. The method as set forth in claim 1, further comprising the step of wide band filtering above a second identified threshold the combined image data to remove artifacts caused by the step of combining the blocking image data and the correction terms to generate an adjusted image data.

6. The method as set forth in claim 5, wherein the second identified threshold is chosen such that only very high frequency components are removed, while sharpness of the image is preserved as much as possible.

7. The method as set forth in claim 1, wherein the step of generating correction coefficients comprises the step of applying a Least Mean Square Error (LMSE) criterium to the Mean Square Error (MSE) of the blocking errors by solving the following to determine the correction coefficients $a_{kl}$:

$$\frac{\partial MSE}{\partial a_{kl}} = 0$$

where $0 \leq k < kx, 0 \leq l < lx, kx*lx$ is equal to the number of correction coefficients used in the correction terms, and $a_{kl}$ are the correction coefficients.

8. The method as set forth in claim 7, wherein the MSE is chosen to be the blocking errors of all pixels in the block as defined by the following equation:

$$MSE = \frac{1}{MN} \sum_{i=0}^{N-1} \sum_{j=0}^{M-1} (E[i][j] + A[i][j])^2$$

$$= \frac{1}{MN} \sum_{i=0}^{N-1} \sum_{j=0}^{M-1} \left( E[i][j] + \sum_{k=0}^{kx-1} \sum_{l=0}^{lx-1} a_{kl} \cdot \cos\left[\frac{(2i+1)k\pi}{2N}\right] \cdot \cos\left[\frac{(2j+1)l\pi}{2M}\right] \right)^2$$

and the resulting solutions of the correction coefficients $a_{kl}$ are determined according to the following equations:

$$a_{kl} = \frac{-1}{MN} \left\{ \sum_{i=0}^{N-1} \sum_{j=0}^{M-1} E[i][j] \cdot \cos\left[\frac{(2i+1)k\pi}{2N}\right] \cdot \cos\left[\frac{(2j+1)l\pi}{2M}\right] \right\},$$

if $k = 0, l = 0$ $$= \frac{-2}{MN} \left\{ \sum_{i=0}^{N-1} \sum_{j=0}^{M-1} E[i][j] \cdot \cos\left[\frac{(2i+1)k\pi}{2N}\right] \cdot \cos\left[\frac{(2j+1)l\pi}{2M}\right] \right\},$$

if $k = 0, l \neq 0$ or $k \neq 0, l = 0$ $$= \frac{-4}{MN} \left\{ \sum_{i=0}^{N-1} \sum_{j=0}^{M-1} E[i][j] \cdot \cos\left[\frac{(2i+1)k\pi}{2N}\right] \cdot \cos\left[\frac{(2j+1)l\pi}{2M}\right] \right\},$$

if $k \neq 0, l \neq 0$ where $E[i][j]$ is the blocking error, $A[i][j]$ is the correction term, and M,N represent the dimensions of the block size.

9. The method as set forth in claim 7, wherein the MSE can be chosen to be the blocking errors of the pixels along the block boundaries as defined by the following equation:

$$MSE = \frac{1}{2(M+N)} \left\{ \begin{array}{l} \sum_{i=0}^{N-1}(E[i][0]+A[i][0])^2 + \\ \sum_{i=0}^{N-1}(E[i][M-1]+A[i][M-1])^2 + \\ \sum_{j=0}^{M-1}(E[0][j]+A[0][j])^2 + \\ \sum_{j=0}^{M-1}(E[N-1][j]+A[N-1][j])^2 \end{array} \right\}$$

where E[ ] [ ]0 the blocking error, A[ ] [ ] represents the correction turn and M,N are the dimensions of the block size.

10. The method as set forth in claim 9 wherein if kx=2 and lx=2, the resulting solutions of the four correction coefficients, $a_{00}$ and $a_{01}$, $a_{10}$, $a_{11}$, are determined according to the following equation:

$$a_{00} = \frac{-1}{2(M+N)} \left\{ \sum_{i=0}^{N-1}(E[i][0]+E[i][M-1]) + \sum_{j=0}^{M-1}(E[0][j]+E[N-1][j]) \right\}$$

$$a_{10} = \frac{-1}{N+2M\cos^2\frac{\pi}{2N}} \left\{ \begin{array}{l} \sum_{i=0}^{N-1}\cos\left[\frac{(2i+1)\pi}{2N}\right](E[i][0]+E[i][M-1]) + \\ \cos\frac{\pi}{2N}\sum_{j=0}^{M-1}(E[0][j]-E[N-1][j]) \end{array} \right\}$$

$$a_{01} = \frac{-1}{M+2N\cos^2\frac{\pi}{2M}} \left\{ \begin{array}{l} \sum_{j=0}^{M-1}\cos\left[\frac{(2j+1)\pi}{2M}\right](E[0][j]+E[N-1][j]) + \\ \cos\frac{\pi}{2M}\sum_{i=0}^{N-1}(E[i][0]-E[i][M-1]) \end{array} \right\}$$

$$a_{11} = \frac{-1}{N\cos^2\frac{\pi}{2M}+M\cos^2\frac{\pi}{2N}}$$

$$\left\{ \begin{array}{l} \cos\frac{\pi}{2M}\sum_{i=0}^{N-1}\cos\left[\frac{(2i+1)\pi}{2N}\right](E[i][0]-E[i][M-1]) + \\ \cos\frac{\pi}{2N}\sum_{j=0}^{M-1}\cos\left[\frac{(2j+1)\pi}{2M}\right](E[0][j]-E[N-1][j]) \end{array} \right\}$$

where E[ ] [ ] represents the blocking error and M,N are the dimensions of the block size.

11. The method as set forth in claim 2, wherein the stop of adjusting the correction coefficients comprises the step of if the correction coefficients is outside a quantization range specified by plus or minus ½ of a quantization step size used during the coding process, adjusting the correction coefficient toward the nearest boundary of the quantization range.

12. The method as set forth in claim 1, wherein the step of calculating the correction terms comprises the performing the following equation:

$$A[i][j] = \sum_{k=0}^{kx-1}\sum_{l=0}^{lx-1} a_{kl} \cdot \cos\left[\frac{(2i+1)k\pi}{2N}\right] \cdot \cos\left[\frac{(2j+1)l\pi}{2M}\right]$$

where M,N represent the dimensions of the block size, $0 \leq i < N, 0 \leq j < M, 0 < kx \leq N, <; 0 < lx \leq M$, and kx*lx is the number of correction coefficients used in the correction term.

13. The method as set forth in claim 1, wherein the step of combining further comprises the step of for each pixel in the block, computing, p'[i][j]=p[i][j]+A[i][j] where p[] [] is the original blocking image and p'[] [] is the produced image exhibiting reduced blocking effects and A[] [] are correction terms.

14. A circuit for minimizing blocking effects in a blocking image caused by prior performance of coding processes including transform and quantization processes, said blocking image described by blocking image data, said circuit comprising:

a first low pass filter coupled to received the blocking image data and output filtered image data, said first low pass filter filtering the blocking image data to remove high frequency components above a first identified threshold;

a blocking error detection subcircuit coupled to receive the filtered image data and the blocking image data and generate blocking error data;

a correction coefficient subcircuit coupled to receive the blocking error data and generating correction coefficients in accordance with the least mean square error of the blocking error data;

correction term subcircuit coupled to receive the correction coefficients and calculating correction terms;

combination subcircuit coupled to receive the blocking image data and the correction terms, said combination subcircuit combining the correction terms and the blocking image data to generate combined image data that exhibits reduced blocking effects.

15. The circuit as set forth in claim 14, further comprising a second low pass filter coupled to receive the combined image data, said second low pass filter filtering out artifacts generated by the combination subcircuit.

16. The circuit as set forth in claim 15, wherein a cutoff frequency of the second low pass filter is higher than a cutoff frequency of the first low pass filter.

17. The circuit as set forth in claim 14, wherein a cutoff frequency of the first low pass filter is set to a frequency such that most of the blocking effects are removed, at the cost of sharpness of the image.

18. The circuit as set forth in claim 15, wherein a cutoff frequency of the second low pass filter is set to a frequency such that only very high frequency components are removed, while sharpness of the image is preserved as much as possible.

19. The circuit as set forth in claim 14, wherein the blocking error detection subcircuit generates blocking error data by subtracting the filtered image data from of the blocking image data.

20. The circuit as set forth in claim 14, wherein the correction coefficient subcircuit determines the correction coefficients $a_{kl}$ according to following equations by applying least mean square errors to the blocking errors of all the pixels in the block:

$$a_{kl} = \frac{-1}{MN}\left\{\sum_{i=0}^{N-1}\sum_{j=0}^{M-1}E[i][j]\cdot\cos\left[\frac{(2i+1)k\pi}{2N}\right]\cdot\cos\left[\frac{(2j+1)l\pi}{2M}\right]\right\},$$

if $k = 0, l = 0$ $$= \frac{-2}{MN}\left\{\sum_{i=0}^{N-1}\sum_{j=0}^{M-1}E[i][j]\cdot\cos\left[\frac{(2i+1)k\pi}{2N}\right]\cdot\cos\left[\frac{(2j+1)l\pi}{2M}\right]\right\},$$

if $k = 0, l \neq 0$ or $k \neq 0, l = 0$ $$= \frac{-4}{MN}\left\{\sum_{i=0}^{N-1}\sum_{j=0}^{M-1}E[i][j]\cdot\cos\left[\frac{(2i+1)k\pi}{2N}\right]\cdot\cos\left[\frac{(2j+1)l\pi}{2M}\right]\right\},$$

if $k \neq 0, l \neq 0$ where $E[i][j]$ is the blocking error, $0 \leq k < kx, 0 \leq l < lx, kx*lx$ is the number of coefficients used in the correction term, M and N represent a first and second dimension of the block size.

21. The circuit as set forth in claim 14, wherein the correction coefficient subcircuit determines the correction coefficients $a_{kl}$ by applying LMSE to the blocking errors of only the pixels along the block boundaries as defined by the following:

$$MSE = \frac{1}{2(M+N)}\left\{\begin{array}{l}\sum_{i=0}^{N-1}(E[i][0]+A[i][0])^2 + \\ \sum_{i=0}^{N-1}(E[i][M-1]+A[i][M-1])^2 + \\ \sum_{j=0}^{M-1}(E[0][j]+A[0][j])^2 + \\ \sum_{j=0}^{M-1}(E[N-1][j]+A[N-1][j])^2\end{array}\right\}$$

where $E[\,][\,]$ represents the blocking error, $A[\,][\,]$ represents the correction turn and M,N are the dimensions of the block size.

22. The circuit as set forth in claim 21, wherein, $kx=2$ and $lx=2$ as the correct coefficients comprise $a_{00}$ and $a_{01}, a_{10}, a_{11}$ as defined by the following equations:

$$a_{00} = \frac{-1}{2(M+N)}\left\{\sum_{i=0}^{N-1}(E[i][0]+E[i][M-1]) + \sum_{j=0}^{M-1}(E[0][j]+E[N-1][j])\right\}$$

$$a_{10} = \frac{-1}{N+2M\cos^2\frac{\pi}{2N}}\left\{\begin{array}{l}\sum_{i=0}^{N-1}\cos\left[\frac{(2i+1)\pi}{2N}\right](E[i][0]+E[i][M-1]) + \\ \cos\frac{\pi}{2N}\sum_{j=0}^{M-1}(E[0][j]-E[N-1][j])\end{array}\right\}$$

$$a_{01} = \frac{-1}{M+2N\cos^2\frac{\pi}{2M}}\left\{\begin{array}{l}\sum_{j=0}^{M-1}\cos\left[\frac{(2j+1)\pi}{2M}\right](E[0][j]+E[N-1][j]) + \\ \cos\frac{\pi}{2M}\sum_{i=0}^{N-1}(E[i][0]-E[i][M-1])\end{array}\right\}$$

$$a_{11} = \frac{-1}{N\cos^2\frac{\pi}{2M}+M\cos^2\frac{\pi}{2N}}$$

$$\left\{\begin{array}{l}\cos\frac{\pi}{2M}\sum_{i=0}^{N-1}\cos\left[\frac{(2i+1)\pi}{2N}\right](E[i][0]-E[i][M-1]) + \\ \cos\frac{\pi}{2N}\sum_{j=0}^{M-1}\cos\left[\frac{(2j+1)\pi}{2M}\right](E[0][j]-E[N-1][j])\end{array}\right\}$$

where $E[\,][\,]$ represents the blocking error and M,N are the dimensions of the block size.

23. The circuit as set forth in claim 14, wherein correction term subcircuit calculates the correction terms using the following equation:

$$A[i][j] = \sum_{k=0}^{kx-1}\sum_{l=0}^{lx-1}a_{kl}\cdot\cos\left[\frac{(2i+1)k\pi}{2N}\right]\cdot\cos\left[\frac{(2j+1)l\pi}{2M}\right]$$

where M,N represent the dimensions of the block size, $0 \leq i < N, 0 \leq j < M, 0 < kx \leq N, <; 0 < lx \leq M$, and $kx*lx$ is the number of correction coefficients used in the correction term.

24. The circuit as set forth in claim 14 further comprising a Q-level adjustment subcircuit to adjust the correction coefficients to be within the quantization range defined by the quantization step size utilized in the coding process;

wherein the correction term subcircuit receives adjusted correction coefficients to calculate correction terms.

25. The circuit as set forth in claim 14 wherein the Q-level adjustment subcircuit adjusts the correction coefficients towards the nearest boundary of a quantization range specified as plus or minus one half the quantization step size if the correction coefficients are outside the quantization range.

26. The circuit as set forth in claims 14, wherein the combination subcircuit combines the correction terms and blocking image data according to the following equation:

p'[i][j]=p[i][j]+A[i][j], where p[] [] is the original blocking image and p'[] [] is the produced image exhibiting reduced blocking effects and A[] [] are the correction terms.

* * * * *